United States Patent
Del Vecchio

[19]

[11] Patent Number: 6,103,292
[45] Date of Patent: Aug. 15, 2000

[54] FOOD PRODUCTS CONTAINING STRUCTURED TRIGLYCERIDES

[75] Inventor: Anthony J. Del Vecchio, Davis, Calif.

[73] Assignee: Calgene, Inc., Davis, Calif.

[21] Appl. No.: 08/843,400

[22] Filed: Apr. 15, 1997

Related U.S. Application Data

[60] Provisional application No. 60/015,983, Apr. 15, 1996.

[51] Int. Cl.[7] .................................................. A23D 7/00
[52] U.S. Cl. .......................... 426/601; 426/549; 426/572; 426/582; 426/660
[58] Field of Search ..................................... 426/588, 585, 426/594, 549, 551, 572, 582, 601, 602, 660, 631

[56] References Cited

U.S. PATENT DOCUMENTS

| | | | |
|---|---|---|---|
| 3,464,830 | 9/1969 | Wahba | 426/572 |
| 3,935,325 | 1/1976 | Gilmore | 426/585 |
| 3,955,008 | 5/1976 | Hanamoto | 426/572 |
| 4,037,000 | 7/1977 | Burge | 426/572 |
| 4,046,926 | 9/1977 | Gardiner | 426/585 |
| 4,146,652 | 3/1979 | Kahn | 426/572 |
| 4,431,682 | 2/1984 | Smith | 426/572 |
| 4,434,184 | 2/1984 | Kharrazi | 426/43 |
| 4,461,777 | 7/1984 | Murase | 426/572 |
| 4,711,788 | 12/1987 | Porcello | 426/572 |
| 4,753,812 | 6/1988 | Wilson | 426/572 |
| 4,784,865 | 11/1988 | Baker | 426/588 |
| 4,826,696 | 5/1989 | Wilson | 426/572 |
| 4,834,991 | 5/1989 | Porcello | 426/572 |
| 4,859,473 | 8/1989 | Arceszewski | 426/551 |
| 4,996,074 | 2/1991 | Seiden | 426/601 |
| 5,102,680 | 4/1992 | Glass | 426/572 |
| 5,135,768 | 8/1992 | Campbell | 426/585 |
| 5,135,769 | 8/1992 | Itagaki | 426/607 |
| 5,171,596 | 12/1992 | Ohgake | 426/302 |
| 5,276,264 | 1/1994 | Heaton | 800/200 |
| 5,288,512 | 2/1994 | Seiden | 426/607 |
| 5,344,771 | 9/1994 | Davies | 800/250 |
| 5,387,758 | 2/1995 | Wong | 800/200 |
| 5,529,800 | 6/1996 | Bourns | 426/572 |
| 5,534,425 | 7/1996 | Fehr | 800/200 |
| 5,545,821 | 8/1996 | Wong | 800/230 |
| 5,625,130 | 4/1997 | Grant | 800/200 |
| 5,626,902 | 5/1997 | Kuramori | 426/607 |
| 5,638,637 | 6/1997 | Wong | 800/230 |
| 5,668,299 | 9/1997 | Debonte | 800/200 |
| 5,684,232 | 11/1997 | Horn | 800/200 |
| 5,714,668 | 2/1998 | Fehr | 800/200 |
| 5,714,669 | 2/1998 | Fehr | 800/200 |
| 5,714,670 | 2/1998 | Fehr | 800/200 |
| 5,750,481 | 5/1998 | Del Vecchio | 510/152 |
| 5,750,827 | 5/1998 | Debonte | 800/200 |
| 5,750,845 | 5/1998 | Fehr | 426/601 |
| 5,750,846 | 5/1998 | Fehr | 426/601 |
| 5,763,745 | 6/1998 | Fehr | 426/601 |
| 5,767,338 | 6/1998 | Fan | 800/200 |
| 5,795,969 | 8/1998 | Fehr | 426/601 |

OTHER PUBLICATIONS

Erickson 1994 Food Technology p. 63–68, Nov. issue.
Charley 1970 Food Science The Ronald Press Co., New York p 227, 229, 230, 231.
Desrosier 1970 Elements of Food Technology The AVI Publishing Co. Inc, Westport CT p 534–535.
Griswold 1962 The Experimental Study of Foods Houghton Mifflin Co. Boston p 268–275.
Lowe 1937 Experimental Cookery John Wiley & Sons, New York, p 542.
Swern 1979 Baileys Industrial Oil and Fat Products vol. 1 4th edition p 414, 415, 419.

*Primary Examiner*—Carolyn Paden
*Attorney, Agent, or Firm*—Arent Fox Kintner Plotkin & Kahn, PLLC

[57] ABSTRACT

Compositions containing structured triglycerides of genetically engineered annuals and food products containing the same.

84 Claims, 3 Drawing Sheets

FOOD PRODUCTS CONTAINING STRUCTURED TRIGLYCERIDES

This application is a non-provisional application claiming benefit of provisional application No. 60/015,983, filed on Apr. 15, 1996 herein incorporated by reference.

FIELD OF THE INVENTION

The present invention relates to edible compositions containing structured triglycerides produced from genetically engineered non-tropical annual crops.

BACKGROUND OF THE INVENTION

Most of the body of knowledge that has been built up over the years regarding the functionality of lipids in food systems has been based on experiments designed around variations of naturally occurring fats and oils. The functional performance of these fats, from whatever source, was related to specific analytical characteristics that still enjoy wide use in the industry, i.e., Solid Fat Index, Iodine Value, and Fatty Acid Composition. In addition to these characteristic values, a number of analytical tests were routinely performed on the fats that were indicators of its quality, or its ability to withstand the stresses of temperature and shelf-life requirements. These included free fatty acid content, peroxide value, color, odor, etc. None of these tests, however, related the functional performance of the fat to the presence (or absence) of any specific triglyceride having a specific structure, i.e., which fatty acid was on which carbon of the glycerol backbone. In the majority of cases, however, such knowledge would have been of academic interest only since the availability of such structured fats in any great proportion within a given fat system were simply not available. Aside from cocoa butter and some of the other more exotic tropical fats, most fats used in foods consist of a random assortment of triglycerides driven by the types and levels of fatty acids that make up their composition, so that such knowledge would have no direct bearing on a formulator's capabilities.

Cocoa butter makes up approximately one third of chocolate's content, and it is responsible for the much-appreciated characteristics of chocolate. Such characteristics include chocolate's hardness and brittleness at ambient temperatures, quick and complete melting in the mouth, gloss, shelf life, aroma and taste.

It is believed that the carbon chain length of the fatty acids making up cocoa butter as well as the symmetry of the acids positioned on the glycerol moiety are responsible for the much-appreciated characteristics. In fact, three fatty acids completely dominate the composition of cocoa butter: palmitic acid, stearic acid and oleic acid. Practically all oleic acids occur esterified in position two of glycerol, with two fully saturated fatty acids, stearic and palmitic acids, occupying the two remaining positions—positions one and three. As reported in *Cocoa Butter Alternatives*, Karlshamns Oils & Fats Academy, page 9, © 1991 (herein incorporated by reference), this gives rise to three completely dominant symmetrical triglycerides, POP (palmitate, oleate, palmitate), POST (palmitate, oleate, stearate) and STOST (stearate, oleate, stearate), that resemble each other closely and make up almost 80% of cocoa butter. Because of this symmetry, cocoa butter is deemed a symmetrical triglyceride. However, because cocoa butter is expensive, and its supply is limited, various researchers have spent considerable amounts of time in developing fats that could serve as alternatives to cocoa butter by providing similar properties to its melting profile and solids content at various temperatures. Several classes of alternatives have been developed, ranging from cocoa butter "equivalents" produced from selected blends of fractions of natural fats that are high in specific triglyceride contents, and which are miscible in all proportions to cocoa butter, to the use of fats containing totally different triglyceride distributions, but which mimic, in many ways, the melting behavior of cocoa butter. An example of the production of a cocoa butter "equivalent" would involve the purification and frationation of a series of different naturally occurring fats to obtain the proper proportion of the desired triglycerides having the desired structure, at the appropriate levels. Commonly used sources of these specialty fats and their triglyceride distributions are given in the table below. The majority of the POP portion required is obtained from palm mid-fraction.

| Triglyceride | Triglyceride Composition of Sal, Kokum, Shea and Illipe Fats (% by weight) | | | |
|---|---|---|---|---|
| | Sal | Kokum | Shea | Illipe |
| POO | 3 | — | 2 | — |
| POSt | 11 | 5 | 5 | 35 |
| StOSt | 42 | 72 | 40 | 45 |
| StOO | 16 | 15 | 27 | 3 |
| StOL | 1 | — | 6 | — |
| StOA | 13 | — | 2 | 4 |
| OOO | 3 | 2 | 5 | — |
| POP | 1 | 0 | 0 | 7 |
| Others | 10 | 6 | 13 | 6 |

Recently, a great deal more effort has been expended against the study of structured triglycerides in foods, and these have led to the market introduction of synthesized species that have been almost exclusively targeted at the confectionery market for the replacement of cocoa butter, with the additional benefit of producing reduced calorie products. These products take advantage of the effects of positional isomerism on the glycerin backbone to address the specific physical properties required in the final food product, plus utilize the differences in caloric contribution of the various fatty acids used to arrive at a lowered calorie intake. The drawback of these novel ingredients is that they are costly to manufacture, and require a series of synthetic steps along with requisite purification procedures. The final price to the end-user is still several dollars per pound. At this price, their ultimate use is restricted to specific niche markets within the food industry rather than being able to effect a significant move towards their use in a wide array of food products.

The assignee of the present application has developed genetically engineered annual plants that will selectively produce laurate canola oil. These plants are described in U.S. Pat. No. 5,344,771, herein incorporated by reference.

In laurate canola oil, two fully saturated fatty acids of equal length occupy positions one and three of the glycerol moiety in a majority of instances, and a C18 fatty acid occupies position two of the glycerol moiety in substantially all instances. The symmetry in the engineered triglyceride is not as prevalent as found in cocoa butter, and for this reason, the triglycerides of the invention are deemed structured triglycerides. In essence, the preferred and dominant occurring structured laurate canola oil looks like this:

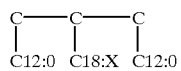

wherein X in the C18 fatty acid is 0, 1, 2 and 3, or the C18 fatty acid may be partially hydrogenated. Hydrogenation will allow for variation in the Solid Fat Index profiles of resulting fats.

The assignee has also produced a structured stearate oil, wherein, again, fully saturated fatty acids of a carbon length of eighteen carbon atoms occupy positions one and three of the glycerol moiety a majority of the time and a C18 fatty acid is found at position two substantially all of the time which may be or may not be partially hydrogenated. Such a structured lipid is described in International Patent Application No. PCT/US91/01746, herein incorporated by reference.

The assignee has now found that substitution of the structured lipids for conventional shortening compositions in food products enhances a host of characteristics of such products.

SUMMARY OF THE INVENTION

A first embodiment of the present invention relates to the manufacture of various food products having enhanced properties such as greater whiteness or enhanced flavor release by replacing conventional non-structured or natural triglyceride lipids traditionally used in such food products with genetically engineered structured lipids.

A second embodiment of the invention is directed to reduced fat or lower fat compositions using the genetically engineered triglycerides of the invention.

A third embodiment of the present invention relates to the use of the structured triglycerides in combination with conventional emulsifiers. Stable oil-in-water emulsions are produced using such systems and it is found that the use of structured lipids allows for a reduction in the amount of emulsifier required to create an oil-in-water emulsion, than is required using non-structured lipids.

A fourth embodiment of the invention is directed to the use of the structured lipids of the invention as replacements for cocoa butter in certain chocolate flavored coatings.

These and other objects of the invention will become apparent by reference to the detailed description of the present invention.

DETAILED DESCRIPTION OF THE INVENTION

Figure 1:
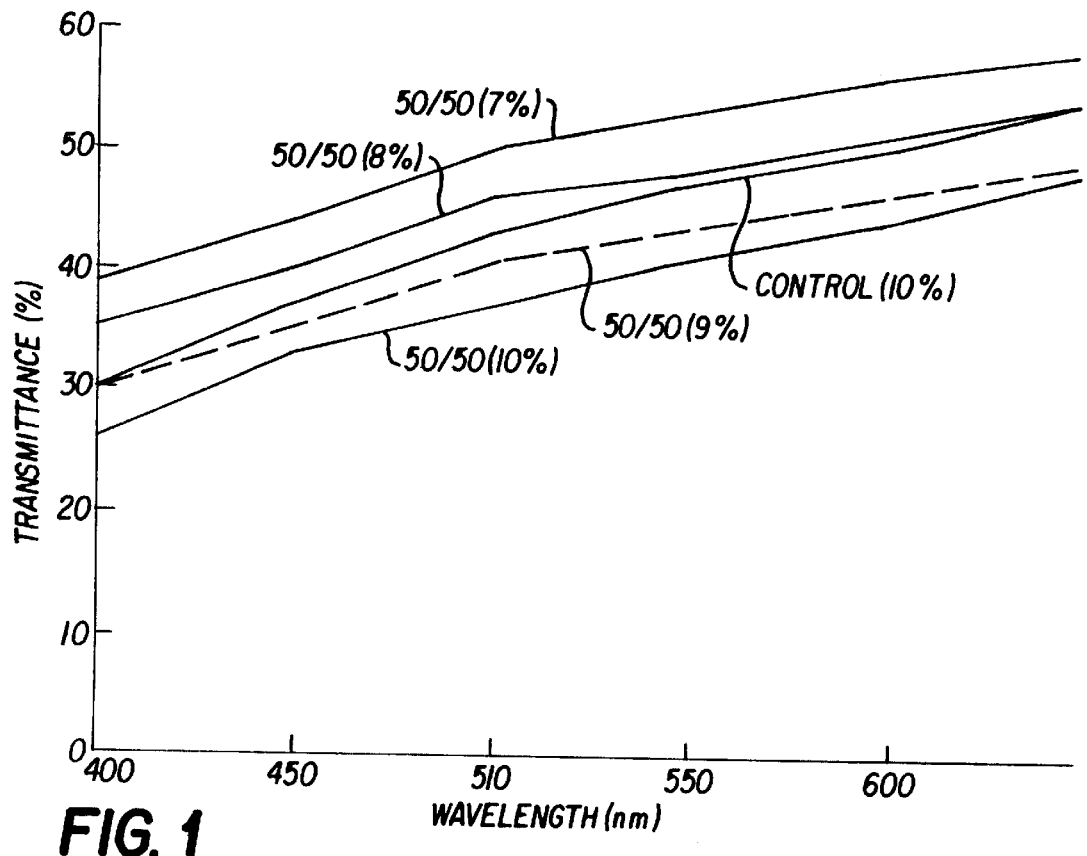
FIG. 1 is a comparison plot of transmittance evidencing whiteness.

The following terms used in the present disclosure are defined as follows:

Engineered structured lipid or triglyceride—any triglyceride produced by a genetically engineered annual plant wherein a majority of the fatty acids at positions one and three of the glycerol moiety are similar, i.e., of equal carbon length and substantially fully saturated, and the fatty acid at position two is substantially a C18:X fatty acid wherein X is 0, 1, 2 and 3 or the C18 fatty acid may be partially hydrogenated.

Non-engineered or natural lipids—any triglyceride produced by non-genetically engineered plants such as soya bean, rape and turnip rape, cotton, coconut palm, cocoa, illipe, shea, etc. Although cocoa and other tropically grown trees may produce symmetrical lipids, these lipids are not produced by annual plants, and are thus not included in the definition immediately above.

β' form—a crystal form of fatty acids showing two peaks of variable intensity at 3.9 and 4.2 Angstrom.

CNO—Coconut oil

IV—Iodine Value, a measure of degree of unsaturated fat. Lower values indicate greater saturation.

PKO—Palm kernel oil

SFI—Solid Fat Index, a measurement related to a percent of solid fats found at a specified temperature. A plot of specific volume versus temperature is used to calculate the percentage of solid fat at any given temperature.

Shortening—an edible fat or triglyceride which may contain one or more additives.

The manufacture of food products using engineered structured lipids generally requires no special techniques. One merely substitutes the engineered shortening for conventional shortening of the art. What is special and surprising is that based on hedonic scoring, reflectances measurements, and other objective and subjective tests, applicants have unexpectedly found that food products containing the engineered structured lipids have, inter alia, enhanced flavor release, good mouth feel, excellent spread properties, and superior whitening ability. The food compositions of the invention will include a genetically engineered structured lipid or triglyceride. These compounds include triglycerides having the formula

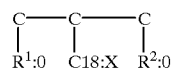

wherein $R^1$ and $R^2$, at least for a majority of the fatty acids at these positions, have carbon lengths of twelve or greater, are substantially completely saturated and are of equal chain length. Preferably $R^1$ and $R^2$ are lauric and stearic acid, but may include the fatty acids of myristic and palmitic or in general fatty acids of C12 or greater.

Generally, $R^1$ and $R^2$ comprise 66 mole % of the fatty acids of the triglycerides and C18:X comprises 33 mole % of the fatty acids. In practice, for instance, up to 40% by weight and preferably up to 58% by weight or greater of $R^1$ and $R^2$ in laurate canola oils are saturated C12 and C14 fatty acids (substantially C12), and for a majority of the oil produced by structuredly engineered plants, $R^1$ and $R^2$ are found to make up about 36–38 weight % of the fatty acids of the triglyceride. See International Application Number PCT/US95/03997 herein incorporated by reference. The amounts of structural laurate oils ultimately obtained from the seeds of the plants may reach 99%.

A C18:X fatty acid is found at position two substantially exclusive of other fatty acids; C18:X represents a fatty acid of eighteen carbon atoms so that X=0, 1, 2 and 3, or C18:X is partially hydrogenated. Thus, the fatty acid found at position two may be a mixture of stearic, oleic, linoleic and linolenic fatty acids, and, if not partially hydrogenated, it will be predominantly unsaturated.

Selective hydrogenation of this oil, then, allows one to closely control the melting properties of the resulting triglyceride, and to manipulate the solids profile of the final fat system. What is noted when these new fats are utilized in typical formulated food systems is that the flavor release offered by these systems was far superior to those offered by the corresponding tropical laurics.

In general, food compositions of the invention will include, in addition to the genetically engineered triglyceride, one or more of the following: salts, sweeteners, water, protein sources, starches, other oils and fats, emulsifying amounts of oil-in-water emulsifiers, food dyes, vitamins, antioxidants, gums, artificial flavor and the like, as well as combinations thereof. Although the present invention is not limited in its broadest aspect to specific ingredients or ranges, generally the sweetener will be present in amounts up to 10–70% by dry weight of the formulation. The sweetener may be any of those conventionally used in the production of food products. Preferably, a substantial portion of the sweetener is dry corn syrup solids. Other suitable sweeteners include maltodextrin, sucrose, fructose, dextrose, etc.

The protein will comprise 4–25% of the formulation. Such proteins include, for instance, soy protein, non-fat milk solids, whey solids, fish protein, a water-soluble or dispersible salt of calcium such as calcium caseinate or sodium caseinate, or a cottonseed protein, yeast protein, etc. Flours include wheat such as semolina or other wheat flour, rice flour, legume flour, oat flour, rye flour, corn flour, etc. Flour may be present in the amounts of 15–50 %.

The genetically engineered lipid is present in amounts of 1–99%. The above percentages do not preclude the presence of minor ingredients in the formulation such as flavoring agents, buffers, and/or stabilizers. Minor amounts of an antioxidant such as butylated hydroxyanisole (BHA), butylated hydroxytoluene (BHT), tertiary butyl hydroquinone (TBHQ), citric acid, propyl gallate, and tocopherols such as vitamin E may be used. TBHQ is preferred.

Emulsifiers which can be used with the triglycerides of the invention include crystallizable emulsifiers such as an alkali or alkaline earth metal salt of an acyl lactylate, such as sodium and calcium stearyl-2-lactylate. Any normally hard or soft mono-and diglyceride having a monoglyceride content from about 30 to about 90% can be used.

Selection of an oil/water emulsifier for the shortening of the present invention is within the skill of the art. In this regard, the emulsifier can be any emulsifier used in the preparation of oil/water emulsions. The emulsifier should be fat soluble or dispersible when used at the level necessary for the emulsification desired.

Any normally hard or soft mono-and diglyceride having a monoglyceride content from about 30 to about 90, the remainder being mainly di-and tri-glycerides, and an IV of about 4 to about 85 can be employed. See, for instance, U.S. Pat. No. 4,239,786, herein incorporated by reference.

The amount of the emulsifier employed should be sufficient to maintain an oil/water emulsion of, for instance, a whitener formulation. For this purpose, preferably a plastic emulsifier is employed. At functional levels, hard emulsifiers could cause set-up or excessive viscosity of the fluid shortening formulation. With an emulsifier such as a mono- and diglyceride, for a spray dried product, about 9–10% based on the weight of the shortening maintains the whitener formulation as an emulsion form until spray drying takes place.

Another suitable emulsifier is Dur-Em 114 (trademark, SCM Corporation), a mono- and diglyceride derived from soybean oil having a monoglyceride content of about 40%, and IV of 70–75 and a Capillary Melting Point of about 110°–120° F.

For a liquid whitener, it is preferable to employ a blend of emulsifiers, such as EC-117, (trademark, SCM Corporation) a blend of mono- and diglycerides and lactylic esters of fatty acids. Such emulsifier has a WICLA (Water Insoluble Combined Lactic Acid) of about 4.8% (minimum), a mono-diglyceride content of about 24–32%, and a Capillary Melting Point of about 123°–133° F. This emulsifier provides freeze-thaw stability for the liquid whitener. For a liquid whitener suitable for refrigeration storage, where freeze-thaw stability is not necessary, a mono-diglyceride in the form of a white bead from hydrogenated vegetable oils (containing citric acid) having a mono-diglyceride content of about 40% (minimum), an IV of about 5 max., and a Capillary Melting Point of about 145°–150° F., can be used.

Other fat soluble or dispersible emulsifiers which can be used in the shortenings and in coffee whiteners of the present invention include distilled monoglycerides; ethoxylated fatty acid esters such as ethoxylated mono- and diglycerides; acyl lactylates such as sodium or calcium stearoyl-2-lactylate; succinylated mono- and diglycerides; propylene glycol monoesters; and polyoxyethylene-containing fatty acid esters such as polysorbate 60, sorbitan esters and ethoxylated sorbitan esters.

For a spray dried product, blends of emulsifiers which can be used include, for instance, a mono- and diglyceride with a lactylic ester of a fatty acid.

The ethoxylated fatty acid esters, and their manufacture, are described in Egan U.S. Pat. No. 3,433,645, incorporated herein by reference. The fatty acid radicals are higher fatty acid chains preferably having about 12 to about 18 carbon atoms. Ethoxylated mono- and diglycerides are the polyethoxylated fatty acid esters of glycerol and may conveniently be described as mixtures of stearate, palmitate and lesser amounts of myristate partial esters of glycerin condensed with about 18 to 22 moles of ethylene oxide per mold of α-monoglyceride. Santelle EOM is manufactured from hydrogenated vegetable oils and has an acid value maximum of 2, an hydroxyl value of 60–80, and an IV number based on fatty acid content of 3 maximum and an oxyethylene content of 60.5–65.0%.

Useful polyoxyethylene-containing fatty acid esters are the polysorbates such as polyoxyethylene sorbitol distearate, polyoxyethylene sorbitan monostearate, polyoxyethylene sorbitan monolaurate, as well as other similar ethoxylated fatty acid esters. An example of a suitable propylene glycol monoester is Myverol P-06 (trademark, Eastman Chemical) having an IV of about 5 and a congeal point of about 113.

Blending of the structured triglyceride and the disclosed emulsifiers can be achieved in a monomer as disclosed in U.S. Pat. No. 4,239,786, herein incorporated by reference. What is remarkable is the fact that the emulsifiers can be used in reduced amounts with the structured triglycerides as compared to amounts needed to maintain oil-in-water emulsions with the natural triglycerides or non-engineered triglycerides. Of course, the compositions will ultimately be consumed via a food product. For whiteners, the product may be a beverage, for example, one produced from the leaves, seeds, pods, beans, bark, fruit or roots of a plant, such as coffee or tea, etc.

The following examples illustrate the present invention.

A conventional coffee whitener formulation has the following composition:

| | |
|---|---|
| Vegetable fat | 10.00% |
| Corn syrup solids (35 D.E.) | 10.00% |
| Sodium caseinate (Erie 400) | 1.25% |
| Emulsifier (DUR-Em44) | 0.2–1.0% |
| Buffer | 0.1–0.5% |
| Stabilizer | 0.02–0.5% |
| Other | 0.4% |
| Water | Balance |

About one-half of the solids of a typical coffee whitener formulation is vegetable fat, wherein the fat may include partially hydrogenated vegetable oils such as palm kernel, soybean and cottonseed. One such vegetable oil product is sold by Van Den Dergh as Paramount X.

EXAMPLES

All the examples below disclosing specific triglycerides should be used as guides and not as absolutes, as many structured triglycerides composed of different ratios of fatty acids may be used.

Whitening of, for instance, as related to a coffee whitener, occurs as a result of light being reflected from the surface of the finely divided fat globules within the product. The engineered structured lipid or triglycerides used in compositions of the invention produce crystals that enhance the whitening properties of the product. This enhanced whitening allows for the production of reduced fat formulations.

Liquid whiteners of the invention are prepared by co-melting the engineered structured triglyceride of the invention with an emulsifier and adding this melted composition to dipotassium phosphate (buffer) in cold water.

A dry mix of corn syrup solids, sodium caseinate, lactylate and carrageenan are added to the aqueous mixture with additional water, if necessary, and with vigorous mixing to dissolve all solids. The mixture is heated to 120° F. and remaining ingredients according to the conventional formulation are added. The mixture is pasteurized at 160° F. for 30 minutes, homogenized at 2500+500 psi and cooled rapidly to 40° F. The composition is to remain refrigerated between use. The following fat and reduced fat formulations were produced.

| | Example 1 Full Fat Formulation, % | Example 2 Reduced Fat Formulation, % |
|---|---|---|
| Water | 77.35 | 80.35 |
| Engineered Structured Lipids | 10.00 | 7.00 |
| Corn Syrup Solids, 35 DE | 10.00 | 10.00 |
| Sodium Caseinate[1] | 1.25 | 1.25 |
| Emulsifier[2] | 0.50 | 0.50 |
| Dipostassium phosphate | 0.30 | 0.30 |
| Carrageenan[3] | 0.20 | 0.20 |
| Sodium Stearoyl Lactylate[4] | 0.40 | 0.40 |

Sources:
[1]Erie Food, Erie 400
[2]Van Den Bergh, Dur-Em 114
[3]EMC, Viscarin GP 109
[4]American Ingredients Co.

The engineered structured triglyceride of the full fat formation used as an example of a structured triglyceride in Example 1 is a laurate canola oil; it has a melting point of 95° F. an IV of 45, and is further characterized as:

| Fatty Acid | Weight % |
|---|---|
| C8:0 | 0.0 |
| C10:0 | 0.1 |
| C12:0 | 34.8 |
| C14:0 | 3.8 |
| C16:0 | 3.0 |
| C18:0 | 5.5 |
| C18:1 | 45.8 |
| C18:2 | 3.3 |
| C18:3 | 0.8 |
| C20:0 | 0.6 |
| C22:0 | 0.6 |
| C24:0 | 0.1 |
| Other | 1.6 |

| Solids Profile Temp ° F. | % Solids |
|---|---|
| 50 | 34.5 |
| 70 | 15.5 |
| 80 | 1.6 |
| 92 | 0.3 |
| 100 | 0.1 |
| 104 | 0.1 |

Saturates Profile

Total Saturates 49.0

Total Monosaturates 46.9

Total Polyunsaturates 4.1

Of course, this example using a specific triglyceride is for purposes of illustration and explanation and should not be interpreted as limiting the invention in any way. Preferably, the C12:0 and C14:0 fatty acids of the structured triglycerides used in the present invention are present in the triglycerides in amounts of between 30–40 weight percent and up to 59% or more. These weight percents are obtained from the genetically engineered plants producing the structured triglycerides.

The engineered structured triglyceride of the reduced fat formulation (Example 2) is a laurate canola oil; it has an IV of 35, a melting point of 100° F., and is further characterized as follows:

| Fatty Acid | Weight % |
|---|---|
| C8:0 | 0.0 |
| C10:0 | 0.1 |
| C12:0 | 35.3 |
| C14:0 | 3.5 |
| C16:0 | 3.2 |
| C18:0 | 18.7 |
| C18:1 | 37.1 |
| C18:2 | 0.2 |
| C18:3 | 0.3 |
| C20:0 | 0.8 |
| C22:0 | 0.6 |
| C24:0 | 0.1 |
| Other | 0.1 |

| Solids Profile Temp ° F. | % Solids |
|---|---|
| 50 | 59.7 |
| 70 | 49.6 |
| 80 | 38.8 |
| 92 | 20.7 |
| 100 | 0.0 |
| 104 | 0.0 |

Saturates Profile
  Total Saturates 49.0
  Total Monosaturates 46.9
  Total Polyunsaturates 4.1
Again, this is a non-limiting example.

FIG. 1 is a comparison of percentage transmittance of blends of 7–10% laurate canola oil as the vegetable oil component in a coffee whitener, as compared to "Paramount X," a partially hydrogenated palm kernel oil with lecithin recommended by Van Den Bergh. As shown, 9 and 10% blends of laurate canola oil exhibited less transmittance, i.e., greater reflectance, than Paramount X (the control) and thus imparts greater whiteness. Also as shown, reduced fat compositions containing laurate canola oils perform similarly to the Paramount, especially at the higher wavelengths.

Example 3

Crackers can be prepared from the partially hydrogenated vegetable oils of the invention having excellent snap, improved flavor release over crackers containing conventional shortenings, desirable tender mouth feel, and with minimal bleeding of fats to the surface of the cracker. These crackers can be produced, for example, with the ingredients as shown in the table below:

|  |  | Batch |
| --- | --- | --- |
| Ingredient | Weight, % | Wt., grams |
| Sponge |  |  |
| Flour, moisture 8.8% (1) | 50.73 | 650.80 |
| Genetically Engineered Lipid | 10.13 | 130.00 |
| Distilled Water @ 100° F. | 16.91 | 216.90 |
| Yeast | 0.17 | 2.20 |
| Malt Syrup | 0.78 | 10.00 |
| Dough |  |  |
| Flour, moisture 8.8% | 16.76 | 215.00 |
| Salt | 0.67 | 8.60 |
| Baking Soda/Sodium Bicarbonate | 0.34 | 4.30 |
| Calcium Phosphate | 0.16 | 2.10 |
| Distilled Water | 3.35 | 43.00 |

The sponge is prepared by heating the water to 100° F. and dissolving yeast in the water. The engineered triglyceride used in Example 1 is heated to 150° F. The engineered triglyceride and the heated water with yeast are combined, malt syrup and flour are added. The ingredients are then blended and molded into a cohesive mass. The sponge is placed in a bowl, covered, and set in a proofer at 80° F. for eighteen hours. Thereafter, the sponge is removed and mixed with dough ingredients of Table I for four minutes, and then the mixture is placed in a covered bowl in a proofer for four hours. The dough is sheeted to one millimeter and folded several times to obtain sixteen layers. The sheeted dough is docked on both sides, cut to fit an aluminum baking sheet, and then baked at 500° F. in a convection oven for 4.5 minutes. The crackers are cooled and then sealed in a plastic bag. As discussed above, these crackers had excellent snap, improved flavor release as compared to crackers containing conventional shortenings, desirable tender mouth feel, and minimal fat bleeding to the surface of the crackers.

Examples 4 and 5

Icings and reduced fat icings based on the engineered structured triglycerides of the invention can be produced. Suggested formulations for producing icings are set forth below.

|  | Example 4 Ingredients Formula, wt. % | Example 5 Standard Reduced-fat Formula, wt. % |
| --- | --- | --- |
| Sugar, 6× | 70.10 | 70.10 |
| Genetically Engineered Oil | 19.50 | — |
| Genetically Engineered Oil | — | 14.50 |
| Water | 5.80 | 10.80 |
| Mono-and diglycerides (1) | 2.00 | 2.00 |
| Corn Syrup, 42 DE | 1.95 | 1.95 |
| Vanilla, 2× | 0.40 | 0.40 |
| Salt | 0.25 | 0.25 |

(1) Van Den Bergh, Dur-lo ™

The icings are prepared by combining the engineered structured triglyceride with the emulsifier from Van Den Bergh and heating the same until both are well melted. Thereafter, salt and sugar are dry blended, and corn syrup and the fat mixture are added. The ingredients are mixed for three to four minutes at slow speed. Water and flavoring such as vanilla can be added, and the composition is mixed until smooth.

Example 4 was prepared with the genetically engineered triglyceride of Example 1 and the reduced fat formula of Example 5 was produced with the genetically engineered triglyceride of Example 2.

Both the standard formula and the reduced-fat formula exhibited excellent spread properties, excellent mouth feel, and superior flavor release. It is also noted that the genetically engineered triglycerides provide the formulator with the opportunity to produce reduced-fat versions without sacrificing product quality.

Example 6

Vegetable dairy cream cheese containing genetically engineered triglycerides.

A vegetable dairy cheese product is obtained by combining the following ingredients:

| Ingredients | Weight % |
| --- | --- |
| Water | 62.00 |
| Genetically Engineered Lipid | 32.00 |
| Sodium caseinate (1) | 4.50 |
| Locust bean gum (2) | 0.50 |
| Salt, NaCl | 0.50 |
| Emulsifier (3) | 0.50 |
| Flavor | t.s. |

Sources:
(1) Erie Foods, Erie 400
(2) Hercules, FL-50-50
(3) Van Den Bergh, Dur-Em 114

The cheese is prepared by dry mixing sodium caseinate, locust bean gum, and salt. This dry mix is added to the genetically engineered triglyceride of Example 2 maintained at 160° F. in amounts as set forth in the table above. This mixture was added to water which was preheated to 160° F. The mixture was homogenized at 2,000+500 psi. The homogenized mix was heated to 170° F. and an emulsifier was added. The mixture was pasteurized at 170° F. for thirty minutes. Thereafter, antioxidants such as anhydrous citric acid and glucono delta lactone were added and the composition was again homogenized at 2000+500 p.s.i. A vegetable-based cream cheese was packaged hot and stored at 40° F. The cheese exhibited excellent mouth feel and superior flavor release. The pH of the vegetable oil-based cream cheese should be 4.2–4.3 after 24 hours storage at 40° F.

Cream fillings and reduced fat cream fillings can be prepared with the triglyceride of the present invention. The following full fat and reduced fat formulations were prepared.

| Ingredients | Example 7 Full-Fat, Formulation, wt. % | Example 8 25% Reduced-Fat Formulation, wt. % |
|---|---|---|
| Standard Filling Fat | 25.60 | — |
| Genetically Engineered Oil | — | 2.50 |
| Emulsifier [1] | 2.50 | 2.50 |
| Sugar, 6x | 45.90 | 45.90 |
| Milk Solids | 6.00 | 6.00 |
| Salt | 0.20 | 0.20 |
| 70° F. Water, 1st Addn. | 3.70 | 5.70 |
| 70° F., 2nd Addn. | 9.30 | 11.30 |
| 70° F., 3rd Addn | 6.80 | 9.20 |
| Flavor | t.s. | t.s. |

Sources: Van Den Bergh, Dur-lo ™

In order to prepare the cream fillings, the dry ingredients were blended at a low speed for one minute. The genetically engineered structured triglyceride or shortening was added to the blend at low speed for one minute. The first addition of water was added and the ingredients were mixed at a medium speed for five minutes. The bowl was then scraped. A second addition of water was added at a medium speed for five minutes and again the bowl was scraped. A third water mix was added at medium speed for five minutes.

The cream fillings had improved flavor release and mouth feel. As shown, the cream fillings can be produced by reducing the amount of triglyceride 25 %. The triglyceride used in both Examples 7 and 8 was the triglyceride of Example 1.

In another surprising embodiment of the invention, it is found that the genetically engineered triglycerides of the invention can be combined with cocoa butter. What is particularly surprising is that it can be used when cocoa butter makes up greater than three percent of chocolate-flavored confectionery coatings. In fact, it is known in the art that all lauric fats differ from cocoa butter and other non-lauric oils and fats in composition. Because of this difference in composition, cocoa butter and lauric fats are incompatible. In view of this incompatibility, lauric fats could only be used, prior to the present invention, as substitutes for cocoa butter. In practice, cocoa butter substitutes, such as the high lauric acids, can only be used together with low-fat cocoa powder (10% to 12% fat content) as the miscibility of these two fats is poor. On the other hand, cocoa butter replacers such as oils rich in C16/C18 are very miscible with cocoa butter. This compatibility allows a chocolate manufacturer to use cocoa powder with higher fat content or a chocolate flavored liquor in their formulas, creating confections with excellent chocolate flavor. No such flavor advantage is found with the lauric fats. However, it has been found, surprisingly, by the present inventors, that the C12 genetically engineered structured triglycerides of the invention can be used as cocoa butter replacers as they exhibit good miscibility with cocoa butter. In fact, cocoa butter can be used in amounts of greater than 3%, up to 6%, and possibly in even greater amounts, with the structured laurate triglycerides of the invention while imparting an excellent chocolate flavor to confections.

The following formulations represent recommended starting formulations for use in chocolate-flavored confections for enrobing or molding applications. Variations in the types and levels of cocoa butters used will affect the final flavors of the finished product. Two different types of genetically engineered structured C12 triglycerides are used in the examples below. Blending ratios of these triglycerides may significantly affect the melting and texture profiles of finished products. One of ordinary skill in the art will be able to adjust the ratio based on melting points and the SFI of the blends to those closely matching processing and organoleptic needs of a particular product.

Example 9

A milk chocolate-type compound coating will contain the following ingredients.

| Ingredient | Weight, % |
|---|---|
| Sugar, 6x | 49.60 |
| Cocoa Powder, Natural (10–12) | 11.00 |
| Non-fat Milk Powder | 8.00 |
| Genetically Engineered Lipid | 28.00 |
| Genetically Engineered Lipid | 3.00 |
| Lecithin | 0.30 |
| Vanillin | 0.10 |

Processing includes dry blending ingredients such as sugar and cocoa powder, and non-fat milk powder. Thereafter, lecithin is added to an engineered structured lipid and melted. Sufficient milk is added to the mixed powders to form a refinable paste. The paste is refined in a three roll mill to approximately 20 microns. The mixture is conched overnight and then molded into bars. The engineered lipid present in larger amounts is a laurate canola oil having a melting point of 104° and an IV of 25. It is further characterized as follows:

| Fatty Acid | Weight | Saturates Profile | |
|---|---|---|---|
| C8:0 | 0.0 | Total Saturates % | 69.7 |
| C10:0 | 0.1 | Total Monounsaturates % | 30.0 |
| C12:0 | 34.9 | Total Polyunsaturates % | 0.3 |
| C14:0 | 3.5 | Total | 100.0 |
| C16:0 | 3.3 | | |
| C18:0 | 26.2 | | |
| C18:1 | 30.0 | | |
| C18:2 | 0.1 | | |
| C18:3 | 0.1 | | |
| C20:0 | 1.0 | | |
| C22:0 | 0.6 | | |
| C24:0 | 0.1 | | |
| Other | 0.1 | | |
| Total | 100.0 | | |

| Solids Profile Temperature ° F. | % Solids |
|---|---|
| 50 | 66.2 |
| 70 | 59.2 |
| 80 | 52.0 |
| 92 | 30.6 |

-continued

| | |
|---|---|
| 100 | 2.2 |
| 104 | 0.0 |

Again, the fatty acid composition of this example and those to follow are intended for illustration and do not limit the percent weight of the fatty acids in any way.

The second triglyceride, i.e., the one present in amounts of three percent by weight, has an IV of 15 and is further characterized by the following:

| Fatty Acid | Wt. % | Saturates Profile | |
|---|---|---|---|
| C8:0 | 0.0 | Total Saturates % | 84.5 |
| C10:0 | 0.1 | Total Monounsaturates % | 15.0 |
| C12:0 | 36.0 | Total Polyunsaturates % | 0.5 |
| C14:0 | 4.0 | Total | 100.0 |
| C16:0 | 1.5 | | |
| C18:0 | 41.5 | | |
| C18:1 | 12.5 | | |
| C18:2 | 0.1 | | |
| C18:3 | 0.2 | | |
| C20:0 | 1.2 | | |
| C22:0 | 0.1 | | |
| C24:0 | 0.1 | | |
| Other | 2.7 | | |
| Total | 100.0 | | |

| Solids Profile Temperature ° F. | % Solids |
|---|---|
| 50 | 75.7 |
| 70 | 75.2 |
| 80 | 73.8 |
| 92 | 67.8 |
| 100 | 45.0 |
| 104 | 21.3 |

Most lauric fats crystallize in the beta prime form, without the need to go through any elaborate tempering step during the processing of the coating mass. Through X-ray crystallography, laurate canola oil was found to crystallize into a beta-prime crystal, with no polymorphism exhibited. With this knowledge, the product of Example 9 was evaluated in a standard confectionery coating formulation vs. commercial lauric fats based on both PKO and CNO. The results of these experimental evaluations revealed some significant differences between the laurate canola coatings and those made using PKO or CNO-based fat systems, including:

Significant increased flavor impact with laurate canola.
Increased coating shelf life (decreased bloom) when using laurate canola.
Preferred mouthfeel over standard laurics.

Typical lauric fats have limited compatibility with cocoa butter, and tend to produce eutectic effects in admixtures that create softer fats than either of the two base fats alone. This is primarily caused by the interference of the crystallization path of the lauric fat on the crystallization dynamics of the cocoa butter. The addition of only a few percent of cocoa butter into a typical lauric fat will result in this softening effect, causing the resulting fat blend to be unsuitable for use in coating applications. With laurate canola, however, such negative interactions with cocoa butter do not occur until significant levels of cocoa butter (ca. 40% on an oil basis) were admixed. This means that sources of "chocolate" flavor, typically those high in cocoa butter, can now be used to impart more of the desired flavor to the finished goods when laurate canola is used as the base fat for the coating. The actual mechanism of this co-crystallization effect has not yet been determined, but the functional effects of such blends, as interpreted through SFI curves of the laurate canola/cocoa butter systems, is clear.

In general, one can combine different combinations of laurate canola oils, i.e., oils of different hydrogenation.

Figure 4:
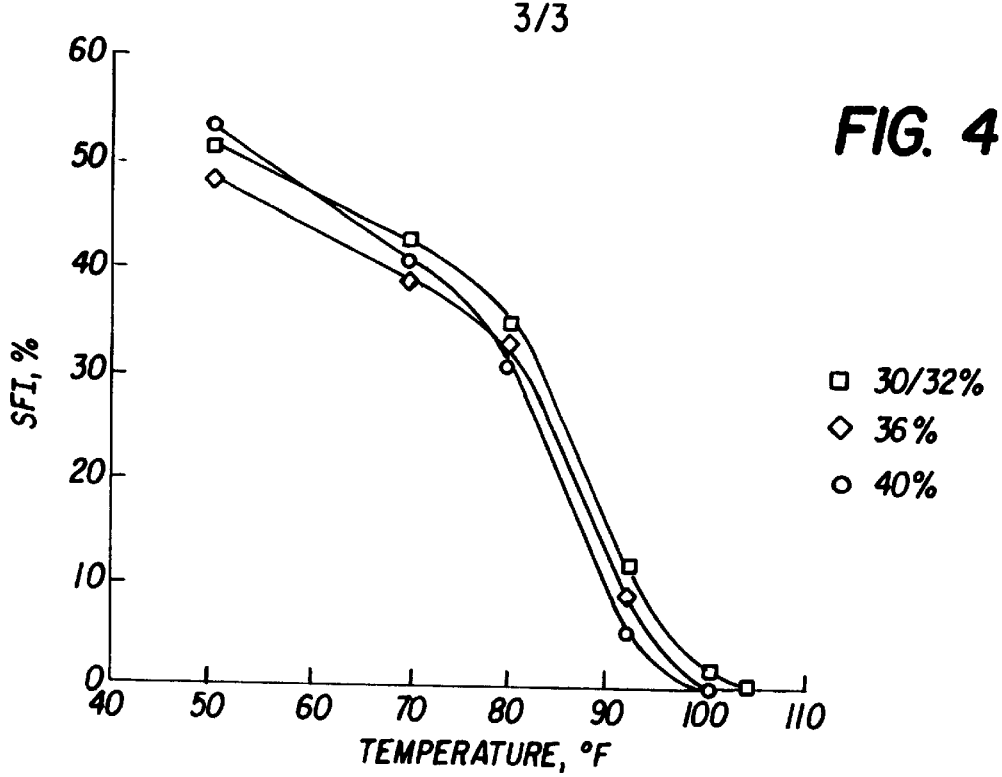
FIG. 4 shows effects of hydration on Solid Fat Index curves of final fats.

FIG. 4 shows that the slopes of Solid Fat Index curves become steeper as the level of C12 increases. It is also apparent that the tailing of the curves toward the higher melting end (the so-called waxy portion of the curve) is minimized as the C12 content increases.

Figure 5:
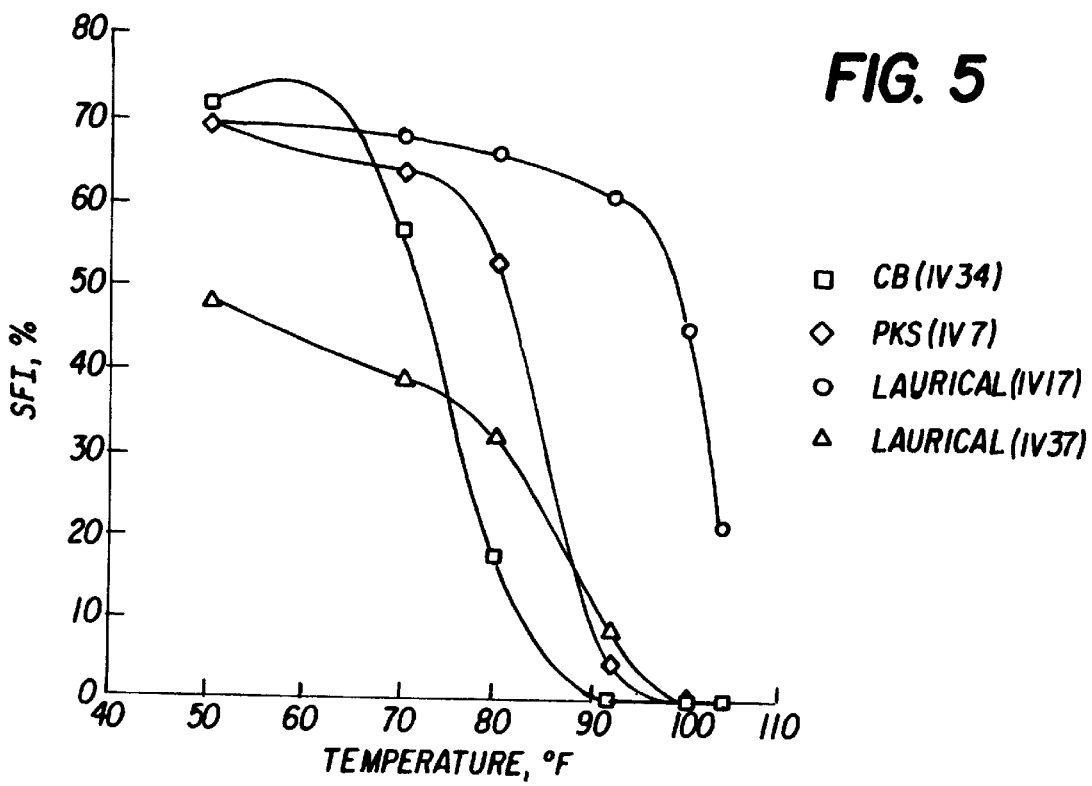
FIG. 5 shows the effects of hydration on a particular structured laurate canola oil.

FIG. 5 shows that, in examining a specific laurate canola having approximately 38% C12 content with various degrees of hydrogenation, i.e., by varying the content of C18:0 vs. C18, unsaturates that occupy the sn-2 position the following effects on the SFI (Solid Fat Index) curve are noted.

As a reference, the SFI for palm kernal stearine is also provided. The solids profile that it provides is bracketed by two laurate canola products; one with an IV of 25 and one with an IV of 35. With this data, one can effectively match the solids profile, at least in the melting range around body temperature, that most manufacturers require for their products.

Example 10

Milk chocolate-type coatings can be prepared for enrobing using the following ingredients.

| Ingredient | Weight % |
|---|---|
| Sugar, 6× | 49.60 |
| Cocoa Powder, Natural (10–12) | 11.00 |
| Non-fat Milk Powder | 8.00 |
| Genetically Engineered Lipid | 31.00 |
| Lecithin | 0.10 |
| Vanillin | 0.10 |

Procedures for making such coatings are the same as above. Products can be molded into bars for subsequent use, or used directly for application on baked products.

These products have excellent flavor release, good compatibility with cocoa butter, they do not require tempering, they exhibit excellent shelf life and superior texture (mouth feel and melt down). The products also exhibit excellent snap and gloss.

The engineered triglyceride of Example 10 is the triglyceride used in minor amounts in Example 9.

Example 11

In an attempt to better quantify the flavor release properties of structured lipids of the invention versus other conventional oils when used in model food systems, testing of flavor perception using a standard butter flavor was suspended in the structural lipids of the invention at equal levels. Following are the results of these tests:

METHOD USED:
1. Unflavored popcorn was air popped.
2. Each test oil was melted and a controlled amount of butter flavor admixed.
3. Popped popcorn was weighed into 50 g portions.
4. Melted oil/flavor mixture was sprayed over the popcorn while it was being agitated.

5. The popcorn and oil blend was weighed after oil application to assure that the oil was on the popcorn, and did not include the amount on the walls of the tumbling vessel.
6. Flavored popcorn was tested using a blind taste panel of five experienced tasters.

| FORMULAS AND MATERIALS USED: | | |
|---|---|---|
| Ingredient | Source | Weight % |
| Popcorn | Orville Reddenbacher | 89.13 |
| Fine Salt | Morton's Popcorn Salt | 00.36 |
| Butter Flavor | Tastemaker 330568 | 00.32 |
| Oil | Variable | 10.20 |
| Variables: | Test 1: | a: structured lipid IV 45 |
| | | b: Code 321 (VDB) |
| | Test 2: | a: structured lipid IV 45 |
| | | b: structured lipid IV 35 |
| | | c: Satina 34 (VDB) |
| | | d: Code 321 (VDB) |

RESULTS

Test 1: The lipid IV 45 was strongly preferred vs. Code 321 (a high stability spray oil). 4 of the 5 panelists preferred the flavor from the IV 45, while the 5th panelist had no preference.

An additional flavor test was conducted to isolate flavor release properties from the individual fats—at least on an organoleptic basis—from those effects that might be caused by differences in solids at body temperature.

Test 2: Test 1 was repeated with the additional inclusion of two additional fats: IV 35 (SFI @ 92° F.=10.7%) and Satina 34 (VDB, SFI @ 92° F.=1.0%). Previous fats included were IV 45 (SFI @ 92° F.=0.3%) and Code 321 (SFI @ 92° F.=3%–8%). The scoring of Test 2 is shown below, with the lowest numbers representing the most preferred fat base in terms of flavor release (hedonic scoring was 1=like intensely; 4=dislike intensely). Actual scores given represent total sums from all panelists.

| Fat | Score | SFI @ 92F |
|---|---|---|
| Satina 34 | 6 | 1.0 |
| structured lipid IV 45 | 10 | 0.3 |
| Code 321 | 16 | 3–8 |
| structured lipid IV 35 | 18 | 10.7 |

The results of this test confirm (directionally) the preference for the flavor release provided by structured lipid IV 45 vs. Code 321, a fat currently marketed as a spray-on for flavor carrying. There is no directional indication, however, that SFI at 92° F. is a determinant or participant in the flavor release process.

In order to provide more objective data regarding flavor release, tests were conducted to determine the release rate of three aroma compounds, ethyl acetate, ethyl caprolate and limonene, in three model food systems: a pure oil system, an oil-in-water emulsion, and a water-in-oil emulsion, wherein the oil was either structured laurate canola oil or a random laurate canola oil.

Release rates were determined using a flame ionization detector in a GC system.

The pure structured oil (Laurical) appears to delay or slow the release of ethyl acetate greatly as compared to random lauric oil. Structured or random oil type had less effect on aroma release for the ethyl hexanoate and limonene. It appears that ethyl hexanoate was released more slowly from the random oil between 1 and about 3 minutes, but had a very similar release profile compared with structured oil, either before or after that period. Limonene was generally released more slowly from the randomized oil. The data from these experiments was very reproducible.

Differences in release were noted for the oil-in-water and water-in-oil systems, but were not as dramatic as those encountered for the pure oil systems.

The remaining examples are directed to food compositions containing engineered structured oils or triglycerides prepared from structured triglycerides other than lauric canola oil.

Generally, breads and cakes emulsified with structured stearate oil showed softer crumb at the end of test periods than did controls produced with conventional oils. Breads with unemulsified engineered structured stearate oil and unemulsified conventional canola oil performed nearly identically. The emulsified genetically engineered stearate oils had a softer crumb throughout the tests. The oil and emulsifier levels used throughout resulted in a very narrow crumb texture range, resulting in a more uniform and consumer-acceptable product.

Example 12

BREADS

Breads can be prepared from the oils of the invention. These breads can be produced as follows:

| | FORMULAS | |
|---|---|---|
| Ingredient | Batch Weight, g | Percent, % |
| Sponge | | |
| Flour, Bread | 175.1 | 35.10 |
| Water, Distilled | 123.7 | 24.79 |
| Yeast | 5.0 | 1.00 |
| Yeast Food | 1.2 | 0.24 |
| Dough | | |
| Flour, Bread | 116.7 | 23.39 |
| Water, Distilled | 30.9 | 6.19 |
| Sugar, Baker | 19.9 | 3.99 |
| Nonfat Dry Milk | 5.0 | 0.98 |
| Salt | 5.0 | 1.00 |
| Calcium Pro | 0.3 | 0.06 |
| Oil, Variable | 16.2 | 3.25 |
| Total: | 498.9 | 100.00 |

Oil Variables

All oils were used at the same level.

1. Van den Bergh Food's Beta Plus™
2. Canola oil, Wesson retail product with sodium stearyl lactylate (Oil 95%, SSL 5%).
3. Canola oil, Wesson with emulsifiers (Oil 79.6%, Van den Bergh's Tally 100™ 15.4%, SSL 5%).
4. Calgene Stearate Canola Oil (Oil 95%, SSL 5%).
5. Calgene Oil with emulsifiers (Oil 79.6%, Tally 100™ 15.4%, SSL 5%).

Emulsifiers were mixed in the oils and heated to 170° F., mixed until homogeneous and cooled to room temperature prior to use.

Figure 2:
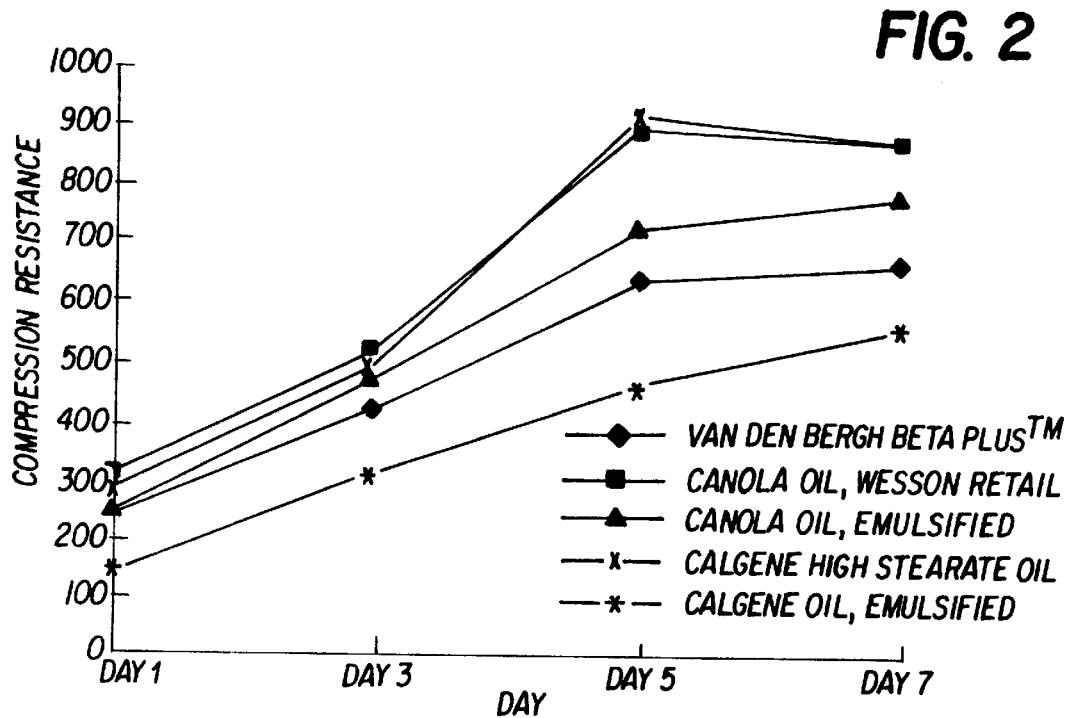
FIG. 2 is a comparison plot of bread compression resistance over time intervals.

The breads were prepared by blending together the sponge ingredients except for the yeast. Water was heated to 100° F. and yeast was dissolved in the water. Water and yeast thereafter were added to the dry ingredients. The ingredients were mixed until a cohesive mass was obtained. The mass was covered with plastic wrap, placed in an insulated box, and allowed to ferment for four hours. After the four hour fermentation, the sponge was removed. It was a puffy, spidery, sticky mass, and was kneaded briefly to fit into a Farinograph. The sponge, dough ingredients, and water were placed into the Farinograph. The cover was closed and it was started for 30 seconds and stopped while the sides were scraped down. Thereafter, mixing continued for an additional 6.5 minutes. The dough was removed, cut into balls of 225 gram portions. The portions were rolled, turned and folded three times. On the final roll, the roll was stretched into a pup pan sized cylinder where air was excluded as much as possible from the pan. The dough was then placed into a pan and the pan was warmed to 85° F. in a proofing cabinet. The dough was allowed to rise 1.5 inches over the pan (for about 90 minutes). A convection oven was preheated to 360° F. and the dough was baked for seventeen minutes. The bread was removed from the pan. The bread was allowed to cool and was sealed in plastic bags. One inch bread slices were tested for compression resistance on days 1, 3, 5 and 7, with a TA-XT2 texture analyzer. The results are shown in FIG. 2.

RESULTS/DATA

| Variable | Compression Resistance in Grams | | | |
|---|---|---|---|---|
| | Day 1 | Day 3 | Day 5 | Day 7 |
| Van den Bergh Beta Plus | 253 | 433 | 634 | 656 |
| Canola Oil, Wesson retail | 319 | 519 | 900 | 871 |
| Canola Oil, emulsified | 256 | 480 | 722 | 769 |
| Calgene High Stearate Oil | 294 | 501 | 917 | 867 |
| Calgene Oil, Emulsified | 146 | 324 | 470 | 550 |

Discussion

Unemulsified Calgene laurate canola oil and conventional canola oils performed nearly identically in the breads over the life of the test.

Beta Plus™ control and emulsified Wesson canola breads had nearly the same softness at day 1, but the Beta Plus™ bread was significantly softer by day 7.

Breads made with the emulsified Calgene laurate canola oil started softer and remained softer throughout the test period.

There is some variability in the hand forming method used in this test that can result in inconsistencies that may impact results (i.e., the incorporation of air spaces, areas of slightly denser crumb structure, and "firm" ridges at roll seams). We tried to minimize these variables as much as possible.

Example 13

CAKES

Seven series of cakes were prepared with the following ingredients:

| | FORMULAS | | | | | |
|---|---|---|---|---|---|---|
| | Series 1,2,3,4,5 | | Series 6 | | Series 7 | |
| Ingredient | grams | % | grams | % | grams | % |
| Cake Flour | 288.0 | 22.40 | 288.0 | 22.57 | 288.0 | 22.75 |
| Sugar, Bakers | 330.0 | 25.66 | 330.0 | 25.87 | 330.0 | 26.07 |
| Nonfat Dry Milk | 36.0 | 2.80 | 36.0 | 2.82 | 36.0 | 2.84 |
| Salt | 9.0 | 0.70 | 9.0 | 0.71 | 9.0 | 0.71 |
| Baking Powder | 18.8 | 1.46 | 18.8 | 1.47 | 18.8 | 1.49 |
| Egg White, Dry | 27.0 | 2.10 | 27.0 | 2.12 | 27.0 | 2.13 |
| Water, Distilled | 477.0 | 37.10 | 477.0 | 37.39 | 477.0 | 37.68 |
| Fat, Variable | 100.0 | 7.78 | 90.0 | 7.05 | 80.0 | 6.32 |
| TOTAL: | 1285.8 | 100.0 | 1275.8 | 100.0 | 1265.8 | 100.00 |

The fat variables are as follows:
Variables:
1. Van den Bergh Food's Fluid Flex™ Usage level 7.78%.
2. Calgene's High Stearate Canola Oil. Usage level 7.78%
3. Calgene's Oil with emulsifier (Oil 65%, EC-25™ 28%, Dur-Em 114K™ 7%). Usage level 7.78%.
4. Calgene's Oil with lower emulsifier levels (Oil 73.75%, EC-25™ 21%, Dur-Em 114K™ 5.25%). Usage level 7.78%.
5. Calgene's Oil with lowest emulsifier levels (Oil 82.5%, EC-25™ 14%, Dur-Em 114K™3.5%). Usage level 7.78%.
6. Calgene's Oil with emulsifier levels in no. 3 above. Usage level 7.05%.
7. Calgene's Oil with emulsifier levels in no. 3 above. Usage level 6.32%.

Emulsifier was placed in oil and heated to 170° F., mixed homogeneous, and cooled to room temperature prior to use.

Method

1. Place dry ingredients into Hobart mixing bowl.
2. Add oil (or shortening).
3. Add 60% of water.
4. Mix on speed 1 for 30 seconds.
5. Scrape bowl and paddle.
6. Mix on speed 2 for 4 minutes.
7. Scrape bowl and paddle.
8. Add 20% of water.
9. Mix on speed 1 for 30 seconds.
10. Scrape bowl.
11. Mix on speed 2 for 2 minutes.
12. Scrape bowl.
13. Add last 20% of water.
14. Mix on speed 1 for 30 seconds.
15. Scrape bowl.
16. Mix on speed 2 for 2 minutes.
17. Pour 425 grams of batter into greased, floured, 4xxxx tinned, 8" steel pans lined with parchment paper.
18. Tap filled pans on counter ten times to deaerate.
19. Bake cakes until done (internal temperature over 200° F.). Vulcan convection oven at 325° F. for 25 minutes, low fan speed, high load setting.

20. Remove from oven.
21. Cool for 30 minutes.
22. Remove cake from pan.
23. Cooled cakes were sealed in plastic bags.
24. Cakes were measured for volume with a layer cake measuring template, AACC Method 10–91.
25. Cakes were tested for compression resistance with a TA-XT2 texture analyzer on days 1, 3, 5 and 7.

Figure 3:
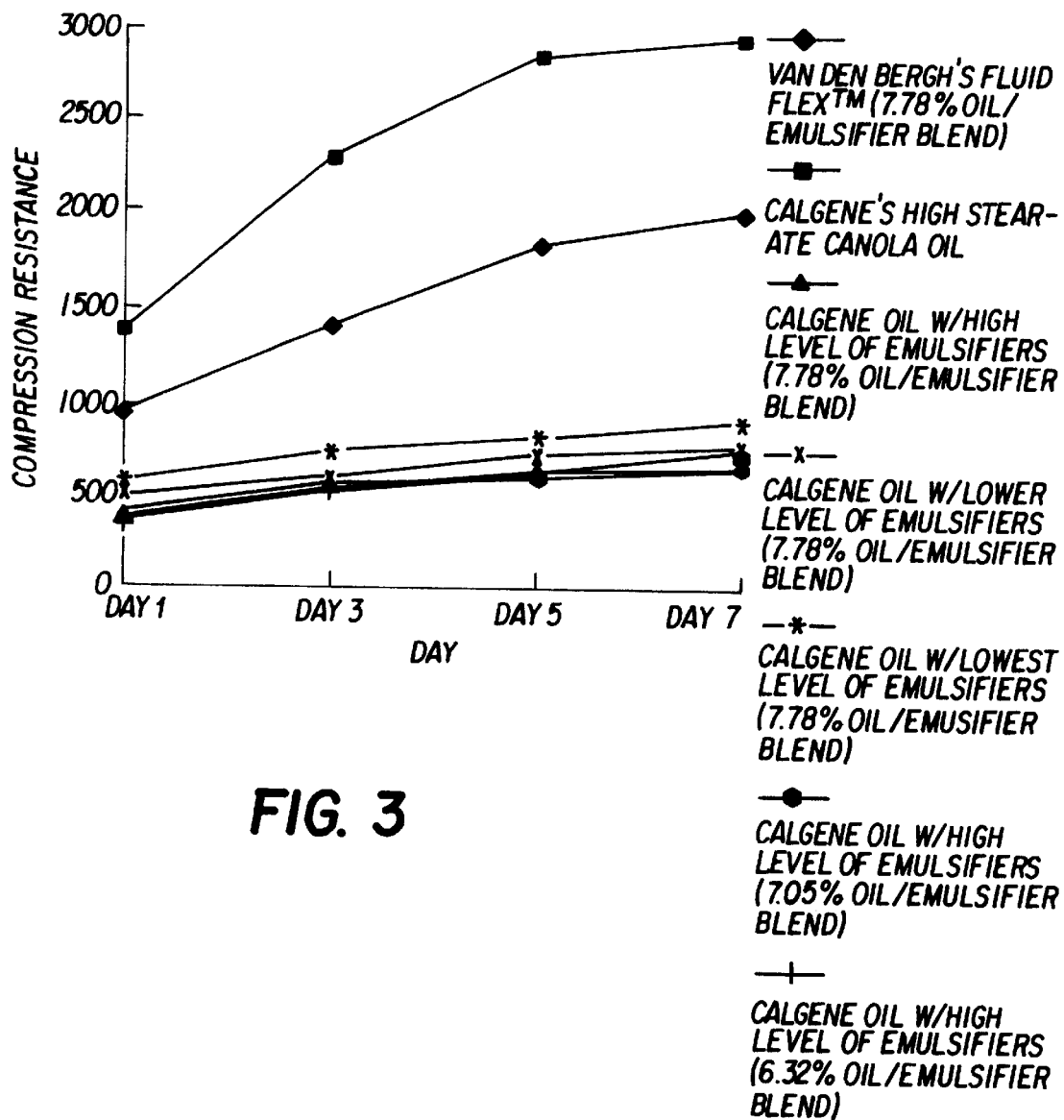
FIG. 3 is a comparison plot of cake compression resistance.

The results are shown in FIG. 3.

| RESULTS/DATA | | |
| --- | --- | --- |
| Variable No. | Cake Volume Index | Batter Density, g/100 ml |
| 1 | 74.5 | 81.52 |
| 2 | 69.5 | 116.84 |
| 3 | 104.5 | 53.36 |
| 4 | 103.4 | 62.96 |
| 5 | 108.0 | 88.48 |
| 6 | 111.0 | 56.04 |
| 7 | 107.0 | 57.36 |

| CAKE COMPRESSION RESISTANCE (g) | | | | |
| --- | --- | --- | --- | --- |
| Variable No. | Day 1 | Day 3 | Day 5 | Day 7 |
| 1 | 949 | 1402 | 1827 | 1992 |
| 2 | 1376 | 2279 | 2850 | 2946 |
| 3 | 372 | 541 | 640 | 772 |
| 4 | 490 | 595 | 730 | 790 |
| 5 | 541 | 743 | 824 | 919 |
| 6 | 399 | 579 | 626 | 661 |
| 7 | 374 | 551 | 651 | 665 |

DISCUSSION

1. Softness of cakes made with Fluid Flex was about midway between those made with unemulsified Calgene stearate oil and those made with emulsified Calgene stearate oils throughout the experiment.
2. Crumb softness of cakes made with the emulsified Calgene stearate oils fell within a fairly narrow range at the oil and emulsifier levels used in this test.
3. The cake volume index was significantly higher for all the emulsified Calgene oils.

Results are illustrated in FIG. 3. The cakes made with unemulsified structured stearate oils (Calgene oils) were harder than cakes made with "Fluid Flex." However, the emulsified structural stearate oils produced softer cakes. Crumb softness of cakes made with emulsified structured stearate oils fall within a fairly narrow range at the oil and emulsifier levels used. Cake volume index was significantly higher for all the emulsified structured oils.

What is claimed is:

1. A method for enhancing flavor release of a food product comprising adding to the food product at least one structured lipid produced from a genetically engineered non-tropical annual, wherein the structured lipid is a β'-forming triglyceride, wherein at least a majority of the fatty acids at positions one and three of the β'-forming triglyceride are alike and the fatty acid at position is substantially C18:X, wherein X=0,1,2 or 3, or the C18 fatty acid may be partially hydrogenated, wherein the β'-forming triglyceride comprises 30 to 59 weight % of C12:0 and C14:0 fatty acids combined.

2. The method of claim 1, wherein X is not 0.

3. The method of claim 1 wherein a majority of the fatty acids at positions one and three of the β'-forming triglyceride have chain lengths of 12 or greater.

4. The method of claim 1 wherein a majority of the fatty acids at positions one and three of the β'-forming triglyceride is lauric acid.

5. The method of claim 1 wherein a majority of the fatty acids at positions one and three of the β'-forming triglyceride is myristic acid.

6. The method of claim 1 wherein a majority of the fatty acids at positions one and three of the β'-forming triglyceride is stearic acid.

7. The method of claim 1 wherein a majority of the fatty acids at positions one and three of the β'-forming triglyceride is palmitic acid.

8. The method of claim 1, wherein the β'-forming triglyceride comprises 34.8 to 40 weight % of C12:0 and C14:0 fatty acids combined.

9. The method of claim 8, wherein the β'-forming triglyceride comprises 38.4 to 38.8 weight % of C12:0 and C14:0 fatty acids combined.

10. A composition imparting improved flavor release to a food, comprising: (i) a structured lipid produced from a genetically engineered non-tropical annual and (ii) other edible ingredients, wherein the structured lipid is a β'-forming triglyceride, wherein at least a majority of the fatty acids at positions one and three of the β'-forming triglyceride are alike and the fatty acid at position 2 is substantially C18:X, wherein X=0, 1, 2 or 3, or the C18 fatty acid may be partially hydrogenated, wherein the β'-forming triglyceride comprises 30 to 59 weight % of C12:0 and C14:0 fatty acids combined.

11. The composition of claim 10 wherein a majority of the fatty acids at positions one and three of the β'-forming triglyceride have chain lengths of 12 or greater.

12. The composition of claim 10 wherein the edible product is a beverage produced from the leaves, seeds, pods, beans, bark, fruit, or roots of a plant.

13. The composition of claim 12 wherein the beverage is coffee.

14. The composition of claim 12 wherein the beverage is tea.

15. The composition of claim 10 wherein the edible product contains flour.

16. The composition of claim 15 wherein the edible product is leavened.

17. The composition of claim 15 wherein the edible product is leavened with yeast.

18. The composition of claim 10 wherein the edible product contains a sweetener.

19. The composition of claim 18 wherein the sweetener is sugar (sucrose).

20. The composition of claim 10 wherein the edible product contains a milk protein or a salt of a milk protein.

21. The composition of claim 10, wherein the β'-forming triglyceride comprises 34.8 to 40 weight % of C12:0 and C14:0 fatty acids combined.

22. The composition of claim 21, wherein the forming triglyceride comprises 38.4 to 38.8 weight % of C12:0 and C14:0 fatty acids combined.

23. A composition useful as a coffee whitener comprising as major ingredients: one or more structured lipids produced from a genetically engineered non-tropical annual: a sweetener, a water-dispersible protein; and water; wherein the one or more structured lipids are β'-forming triglycerides, at least a majority of the fatty acids at positions one and three of the β'-forming triglycerides are alike and the fatty acid at position 2 is substantially C18:X, wherein X=0,1,2 or 3, or the C18 fatty acid may be partially hydrogenated, wherein the β'-forming triglycerides comprise 30 to,59 weight % of C12:0 and C14:0 fatty acids combined.

24. The composition of claim 23 wherein a majority of the fatty acids at positions one and three of the β'-forming triglyceride have chain lengths of 12 or greater.

25. The composition of claim 23 wherein the sweetener is corn syrup and the water dispersible protein is sodium casein.

26. The composition of claim 23, wherein the β'-forming triglyceride comprises 34.8 to 40 weight % of C12:0 and C14:0 fatty acids combined.

27. The composition of claim 26, wherein the β'-forming triglyceride comprises 38.4 to 38.8 weight % of C12:0 and C14:0 fatty acids combined.

28. A composition useful as a coffee whitener comprising, in approximate percentages by weight:
Water 70–85%
Structured lipid 5–15%
Sweetener 5–23%
Sodium Caseinate 0.5–1.75%
wherein the structured lipid is a β'-forming triglyceride, at least a majority of the fatty acids at positions one and three of the triglyceride are alike and the fatty acid at position 2 is substantially C18:X wherein X=0, 1, 2 and 3, or the C18 fatty acid may be partially hydrogenated, wherein the triglyceride comprises 30 to 59 weight % of C12:0 and C14:0 fatty acids combined.

29. The composition of claim 28 wherein the structured lipid contains about 36–40% by weight of C12:0 and C14:0 fatty acids.

30. The composition of claim 28 and the fatty acid profile comprises:

| | |
|---|---|
| C12:0 | 34.8–35.3 |
| C14:0 | 3.5–3.8 |
| C16:0 | 3.0–3.2 |
| C18:0 | 5.5–18.7 |
| C18:1 | 37.1–45.8 |
| C18:2 | 0.2–3.3 |
| C18:3 | 0.3–0.8 |
| Other | 1.7–3.0 | and the IV value is between 35 and 45.

31. The composition of claim 29 wherein the structured lipid is present in the composition in amounts of 7.0% by weight.

32. A dough for making crackers having improved flavor release, comprising flour, malt syrup, at least one leavening agent, water, and a β'-forming triglyceride, at least a majority of the fatty acids at positions one and three of the triglyceride are alike and the fatty acid at position 2 is substantially C18:X wherein X=0, 1, 2 and 3, or the C18 fatty acid may be partially hydrogenated, wherein the triglyceride comprises 30 to 59 weight % of C12:0 and C14:0 fatty acids combined.

33. The dough of claim 32 wherein the β'-forming triglyceride comprises 34.8 to 40 weight % of C12:0 and C14:0 fatty acids combined.

34. The dough of claim 33, wherein the β'-forming triglyceride comprises 38.4 to 38.8 weight % of C12:0 and C14:0 fatty acids combined.

35. An icing having superior flavor release comprising at least one emulsifier, sucrose, corn syrup, vanilla, salt and a β'-forming triglyceride, wherein at least a majority of the fatty acids at positions 1 and 3 of the β'-forming triglyceride are alike and the fatty acid at position 2 is substantially C18:X, wherein X=0, 1, 2 or 3, or the C18 fatty acid is partially hydrogenated, wherein the triglyceride comprises 30 to 59 weight % of C12:0 and C14:0 fatty acids combined.

36. The icing of claim 35, wherein the fatty acid composition of the β'- forming triglyceride comprises about 34.8–40.0% C12:0 and C14:0 fatty acids.

37. The icing of claim 35, wherein the fatty acid composition of the β'-forming triglyceride comprises the following profile:

| | |
|---|---|
| C12:0 | 34.8–35.3 |
| C14:0 | 3.5–3.8 |
| C16:0 | 3.0–3.2 |
| C18:0 | 5.5–18.7 |
| C18:1 | 37.1–45.8 |
| C18:2 | 0.2–3.3 |
| C18:3 | 0.3–0.8 |
| Other | 1.7–3.0. |

38. A vegetable dairy cream cheese having enhanced flavor release comprising water, a water dispersible milk protein and a β'-forming triglyceride, wherein at least a majority of the fatty acids at positions one and three of the β'-forming triglyceride are alike and the fatty acid at position 2 is substantially C18:X, wherein X=0, 1, 2 or 3, or the C18 fatty acid is partially hydrogenated, wherein the β'-forming triglyceride comprises 30 to 59 weight % of C12:0 and C14:0 fatty acids combined.

39. The vegetable dairy cream cheese of claim 36 wherein water is present in an amount of about 62.0% by weight, the β'-forming triglyceride is present in an amount of about 32%, and the milk protein is present in an amount of about 4.5% by weight.

40. The vegetable dairy cream cheese of claim 39 wherein the fatty acid profile of the triglyceride contains about 35.3–40% C12:0 and C14:0 fatty acids.

41. The cream cheese of claim 38, wherein the β'-forming triglyceride comprises 34.8 to 40 weight % of C12:0 and C14:0 fatty acids combined.

42. The cream cheese of claim 41, wherein the β'-forming triglyceride comprises 38.4 to 38.8 weight % of C12:0 and C14:0 fatty acids combined.

43. A cream filling having enhanced flavor release comprising sucrose, milk solids and a β'-forming triglyceride which is at least partially hydrogenated, wherein at least a majority of the fatty acids at positions one and three of the β'-forming triglyceride are alike and the fatty acid at position 2 is substantially C18:X, wherein X=0, 1, 2 or 3. or the C18 fatty acid is partially hydrogenated, wherein the β'-forming triglyceride comprises 30 to 59 weight % of C12:0 and C14:0 fatty acids combined.

44. The cream filling of claim 43 wherein the β'-forming triglyceride is present in an amount of about 19.00%.

45. The cream filling of claim 44 wherein the fatty acid profile of the triglyceride contains about 34.8–40% C12:0 and C14:0 fatty acids.

46. The cream filling of claim 43, wherein the β'-forming triglyceride comprises 34.8 to 40 weight % of C12:0 and C14:0 fatty acids combined.

47. The cream filling of claim 46, wherein the β'-forming triglyceride comprises 38.4 to 38.8 weight % of C12:0 and C14:0 fatty acids combined.

48. A composition comprising an emulsifier and at least one structured lipid produced from a genetically engineered non-tropical annual for use in a food composition having an oil-in-water emulsion, the emulsifying properties of the emulsifier being increased by the structured lipid allowing for use of less emulsifier than if a non-structured lipid were used, wherein the structured lipid is a β'-forming triglyceride, wherein at least a majority of the fatty acids at positions one and three of the β'-forming triglyceride are alike and the fatty acid at position 2 is substantially C18:X, wherein X=0,1,2 or 3 or the C18 fatty acid may be partially hydrogenated, wherein the β'-forming triglyceride comprises 30 to 59 weight % of C12:0 and C14:0 fatty acids combined.

49. A method for increasing the emulsifying properties of an emulsifier in an oil-in-water or a water-in-oil emulsion comprising using a structured lipid or a symmetrical lipid in substitution for a non-structured lipid to increase the emulsifying properties, wherein the structured lipid is a β'-forming triglyceride produced from a genetically engineered non-tropical annual, wherein at least a majority of the fatty acids at positions one and three of the β'-forming triglyceride are alike and the fatty acid at position two is substantially C18:X, wherein X=0, 1, 2 or 3, or the C18 fatty acid is partially hydrogenated, wherein the β'-forming triglyceride comprises 30 to 59 weight % of C12:0 and C14:0 fatty acids combined, wherein the symmetrical lipid is cocoa butter, a cocoa butter equivalent, and/or the structured lipid produced from a genetically engineered non-tropical annual.

50. The method of claim 49, wherein a majority of the fatty acids at positions one and three have chain lengths of 12 or greater.

51. The method of claim 49, wherein a majority of the fatty acids at positions one and three is lauric acid.

52. The method of claim 49, wherein a majority of the fatty acids at positions one and three is myristic acid.

53. The method of claim 49, wherein a majority of the fatty acids at positions one and three is stearic acid.

54. The method of claim 49, wherein a majority of the fatty acids at positions one and three is palmitic acid.

55. The method of claim 49, wherein the β'-forming triglyceride comprises 30 to 59 weight % of C12:0 and C14:0 fatty acids combined.

56. The method of claim 55, wherein the β'-forming triglyceride comprises 34.8 to 40 weight % of C12:0 and C14:0 fatty acids combined.

57. The method of claim 56, wherein the β'-forming triglyceride comprises 38.4 to 38.8 weight % of C12:0 and C14:0 fatty acids combined.

58. A method for improving the whiteness of a edible product containing a lipid by preparing the edible product with a structured lipid produced by a genetically engineered annual, wherein the structured lipid is a β'-forming triglyceride, at least a majority of the fatty acids at positions one and three of the β'-forming triglyceride are alike and the fatty acid at position 2 is substantially C18:X, wherein X=0,1,2 or 3, or the C18 fatty acid may be partially hydrogenated, wherein the β'-forming triglyceride comprises 30 to 59 weight % of C12:0 and C14:0 fatty acids combined.

59. The method of claim 58 wherein a majority of the fatty acids at positions one and three of the β'-forming triglyceride have chain lengths of 12 or greater.

60. The method of claim 58 wherein a majority of the fatty acids at positions one and three of the β'-forming triglyceride is lauric acid.

61. The method of claim 58 wherein a majority of the fatty acids at positions one and three of the β'-forming triglyceride is myristic acid.

62. The method of claim 58 wherein a majority of the fatty acids at positions one and three of the β'-forming triglyceride is stearic acid.

63. The method of claim 58 wherein a majority of the fatty acids at positions one and three of the β'-forming triglyceride is palmitic acid.

64. The method of claim 58, wherein the β'-forming triglyceride comprises 30 to 59 weight % of C12:0 and C14:0 fatty acids combined.

65. The method of claim 64, wherein the β'-forming triglyceride comprises 34.8 to 40 weight % of C12:0 and C14:0 fatty acids combined.

66. The method of claim 65, wherein the β'-forming triglyceride comprises 38.4 to 38.8 weight % of C12:0 and C14:0 fatty acids combined.

67. A confectionery product comprising cocoa butter or a cocoa butter equivalent and a structured lipid produced from a genetically engineered non-tropical annual, wherein the structured lipid is a β'-forming triglyceride, wherein at least a majority of the fatty acids at positions one and three of the β'-forming triglyceride are alike and the fatty acid at position two is substantially C18:X, wherein X=0, 1,2 or 3, or the C18 fatty acid is partially hydrogenated, wherein the β'-forming triglyceride comprises 30 to 59 weight % of C12:0 and C14:0 fatty acids combined.

68. The confectionery product of claim 67, comprising cocoa butter and a structured lipid produced from a genetically engineered non-tropical annual.

69. The confectionery product of claim 67 wherein cocoa butter is present in amounts of greater than 1%.

70. The product of claim 69, wherein the structured lipid is a β'-forming triglyceride, wherein at least a majority of the fatty acids at positions one and three of the β'-forming triglyceride are alike and the fatty acid at position two is substantially C18:X, wherein X=0, 1, 2 or 3, or the C18 fatty acid is partially hydrogenated, wherein the β'-forming triglyceride comprises 30 to 59 weight % of C12:0 and C14:0 fatty acids combined.

71. The product of claim 70 wherein a majority of the fatty acids at positions one and three of the β'-forming triglyceride have chain lengths of 12 or greater.

72. The product of claim 70 wherein a majority of the fatty acids at positions one and three of the β'-forming triglyceride is lauric acid.

73. The product of claim 70 wherein a majority of the fatty acids at positions one and three of the β'-forming triglyceride is myristic acid.

74. The product of claim 70 wherein a majority of the fatty acids at positions one and three of the β'-forming triglyceride is stearic acid.

75. The product of claim 70 wherein a majority of the fatty acids at positions one and three of the β'-forming triglyceride is palmitic acid.

76. The product of claim 70, wherein the β'-forming triglyceride comprises 34.8 to 40 weight % of C12:0 and C14:0 fatty acids combined.

77. The product of claim 76, wherein the β'-forming triglyceride comprises 38.4 to 38.8 weight % of C12:0 and C14:0 fatty acids combined.

78. The confectionery product of claim 67 wherein cocoa butter is present in amounts of greater than 3% by weight.

79. A milk chocolate type compound coating comprising powdered sugar, cocoa powder, non-fat milk powder and at least one structured β'-forming triglyceride produced from a genetically engineered annual, wherein at least a majority of the fatty acids at positions one and three of the β'-forming triglyceride are alike and the fatty acid at position two is substantially C18:X, wherein X=0, 1, 2 or 3, or the C18 fatty acid is partially hydrogenated, wherein the β'-forming triglyceride comprises 30 to 59 weight % of C12:0 and C14:0 fatty acids combined.

80. The coating of claim 79 wherein two different structure β'-forming triglyceride are present.

81. The coating of claim 80 wherein a first β'-forming triglyceride is a laurate canola oil, and its IV is 25.

82. The coating of claim 80 wherein a first β'-forming triglyceride is a laurate canola oil, and its IV is 15.

83. The coating of claim 79, wherein the β'-forming triglyceride comprises 34.8 to 40 weight % of C12:0 and C14:0 fatty acids combined.

84. The coating of claim 83, wherein the β'-forming triglyceride comprises 38.4 to 38.8 weight % of C12:0 and C14:0 fatty acids combined.

\* \* \* \* \*